United States Patent
Thompson (10) Patent No.: US 10,308,351 B2
(45) Date of Patent: Jun. 4, 2019

(54) AIRCRAFT LANDING GEAR AND A LOCKING MECHANISM THEREFOR

(71) Applicant: AIRBUS OPERATIONS LIMITED, Bristol (GB)

(72) Inventor: Robert Ian Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 364 days.

(21) Appl. No.: 15/166,349

(22) Filed: May 27, 2016

(65) Prior Publication Data
US 2016/0347445 A1 Dec. 1, 2016

(30) Foreign Application Priority Data
May 29, 2015 (GB) .................... 1509296.8

(51) Int. Cl.
*B64C 25/50* (2006.01)
*B64C 25/34* (2006.01)
*B64C 25/26* (2006.01)

(52) U.S. Cl.
CPC .............. *B64C 25/26* (2013.01); *B64C 25/34* (2013.01); *B64C 25/50* (2013.01); *B64C 2025/345* (2013.01)

(58) Field of Classification Search
CPC ......... B64C 25/26; B64C 25/34; B64C 25/50; B64C 2025/345
See application file for complete search history.

(56) References Cited

U.S. PATENT DOCUMENTS

| | | | | |
|---|---|---|---|---|
| 3,522,956 A * | 8/1970 | Sauer | ..................... | B62D 13/02 280/678 |
| 8,376,267 B2 * | 2/2013 | Coles | ..................... | B64C 25/34 244/100 R |
| 8,998,129 B2 * | 4/2015 | Bennett | ................... | B64C 25/34 244/100 R |

(Continued)

FOREIGN PATENT DOCUMENTS

| | | |
|---|---|---|
| EP | 2537748 A2 | 12/2012 |
| GB | 2480623 A | 11/2011 |
| WO | 2006071262 A1 | 7/2006 |

OTHER PUBLICATIONS

Search Report dated Nov. 20, 2015 in Great Britain Application No. 1509296.8.

*Primary Examiner* — Richard R. Green
(74) *Attorney, Agent, or Firm* — Nixon & Vanderhye P.C.

(57) ABSTRACT

Aircraft landing gear comprising a locking assembly including a pair of spaced-apart bearing pads and a lock member. The lock member is moveable between a locked position in which it engages the bearing pads to prevent pivotal movement of a steerable axle, and an unlocked position in which the member is disengaged from the bearing pads such that movement of the axle can occur. The lock member has a guide surface on either side for guiding the member and bearing pads into alignment during movement of the member from the unlocked to the locked position. The guide surface comprises a first inclined portion for moving the member towards alignment with the bearing pads and a second inclined portion, spaced apart from the first portion, for moving the member into alignment with the bearing pads such that the member and bearing pads are aligned in a movement comprising two stages.

13 Claims, 8 Drawing Sheets

(56) References Cited

U.S. PATENT DOCUMENTS

| | | |
|---|---|---|
| 9,162,756 B2 * | 10/2015 | Menezes ................ B64C 25/34 |
| 2010/0078517 A1 | 4/2010 | Coles et al. |
| 2013/0146704 A1 | 6/2013 | Menezes et al. |
| 2014/0061372 A1 | 3/2014 | Briancourt |

* cited by examiner

AIRCRAFT LANDING GEAR AND A LOCKING MECHANISM THEREFOR

RELATED APPLICATIONS

The present application claims priority from Great Britain Application Number 1509296.8, filed May 29, 2015, the disclosure of which is hereby incorporated by reference herein in its entirety.

BACKGROUND OF THE INVENTION

The present invention concerns aircraft landing gear. More particularly, but not exclusively, this invention concerns multi-wheel landing gears comprising at least one steerable axle. The invention also concerns a locking mechanism for a multi-wheel landing gear bogie including a steerable axle.

Multi-wheel landing gears are often used on large aircraft, for example the Airbus A380. The multi-wheel landing gears are used to support the large loads exerted on the landing gears by the aircraft when taxiing, at take-off, and landing. In order to prevent excess tyre wear caused by tyre scrubbing during taxiing, the multi-wheel landing gear may include at least one pair of wheels mounted on a steerable axle. At other times, for example during take-off and landing, it is necessary to lock the steerable axle in the straight ahead position.

Typically, in a multi-wheel landing gear, the steerable axle is pivotally mounted to the landing gear bogie. The steerable axle is steerable by an actuator which may extend and retract in order to change the orientation of the steerable axle. In a known arrangement, the landing gear includes a locking mechanism that comprises a wedge-shaped lock member that is pivotally mounted to the landing gear bogie. The wedge-shaped lock member is arranged to be received between two bearing pads mounted on the steerable axle in order to lock the steerable axle in a 'straight ahead' position for taxi, take off, and landing. The wedge-shaped lock member is secured in the locked position by two springs that act to pull the wedge-shaped lock member into engagement with the bearing pads. An actuator is arranged to act against the springs in order to move the wedge-shaped lock member from away from the bearing pads, such that the steerable axle is unlocked and pivotal movement, away from the straight ahead position, is allowed.

Figure 1:
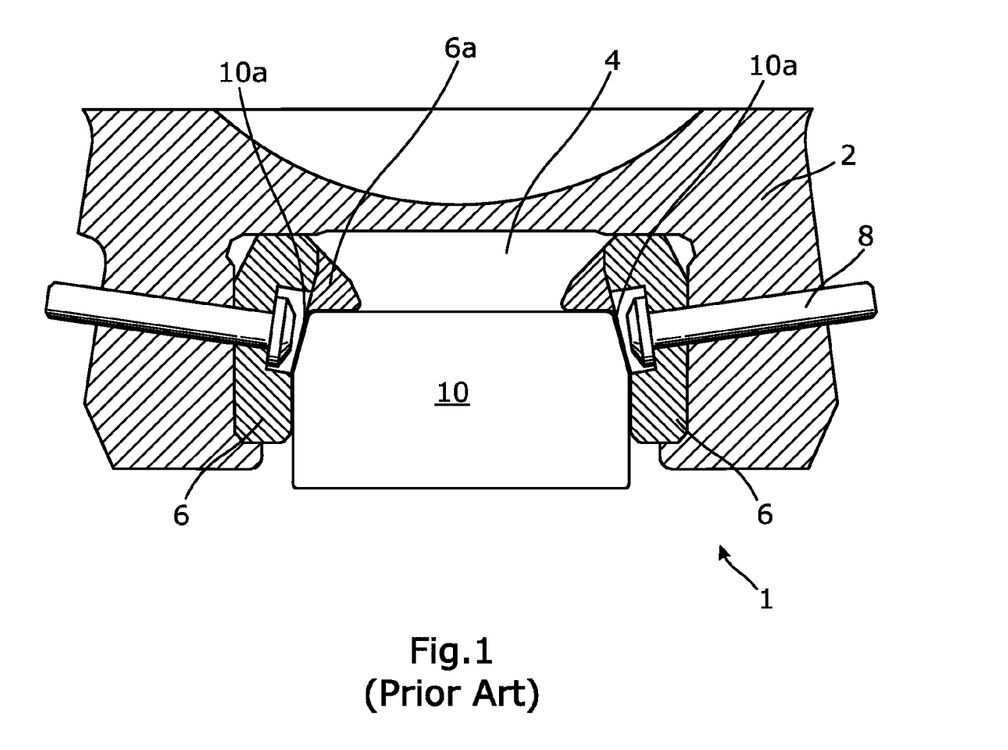
FIG. 1 shows a cross-sectional schematic view of a prior art locking assembly.

FIG. 1 shows a schematic cross-sectional view of this known locking mechanism 1. FIG. 1 shows a portion of the steerable axle 2 having a recess 4 containing two bearing pads 6. The two bearing pads 6 are located on opposite sides of the recess 4 and face each other. Each bearing pad is fixed to the axle 2 using a fixing 8. In the locked position as shown in FIG. 1, a lock member 10 is located in the space between the bearing pads 6. The far end 6a of each bearing pad 6 is hooked to prevent movement of the lock member 10 deeper into the space between the bearing pads 6. Each bearing pad 6 is in contact with a corresponding side of the lock member 10. The front corners 10a of the lock member 10 are bevelled giving the lock member 10 a wedge shape.

Time and/or skill may be required to bring the lock member into sufficient alignment with the bearing pads so that it can move into engagement with the bearing pads. If the lock member 10 is not very closely lined up with the bearing pads 6 when attempting to lock the steerable axle 2, the lock member 10 may not be able to move into the space between the bearing pads 6. In that case, the steerable axle 2 would not be fully locked, and the aircraft would not be able to take off until the problem is fixed; this may cause delays to the aircraft departure time or the grounding of the aircraft.

The present invention seeks to mitigate the above-mentioned problems. Alternatively or additionally, the present invention seeks to provide an improved landing gear mechanism.

SUMMARY OF THE INVENTION

The present invention provides, according to a first aspect, an aircraft landing gear comprising a bogie, a steerable axle pivotally mounted on the bogie, and a locking assembly, the locking assembly comprising a pair of spaced-apart bearing pads associated with the axle and a lock member associated with the bogie, the lock member being moveable between a locked position in which the member is located in the space between the bearing pads such that the lock member engages the bearing pads to prevent pivotal movement of the steerable axle with respect to the bogie, and an unlocked position in which the lock member is disengaged from the bearing pads such that pivotal movement of the axle with respect to the bogie can occur, wherein the lock member has a guide surface on either side for guiding the lock member and the bearing pads into alignment during movement of the lock member from the unlocked position to the locked position, and wherein the guide surface comprises a first inclined portion for moving the lock member towards alignment with the bearing pads in a first stage, and a second inclined portion, spaced apart from the first portion, for moving the lock member into alignment with the bearing pads in a second stage, such that the lock member and bearing pads are aligned in a movement having two stages, for example a two-stage movement.

Aligning the lock member and the bearing pads in a staged movement has been found to reduce the risk of the lock member failing to engage with the bearing pads. Furthermore, aligning the pads in a two (or more)-stage movement using first and second inclined regions tends to facilitate an increase in the capture angle (that is to say the degree of initial misalignment between the lock member and the bearing pads that the locking assembly can accommodate while still successfully engaging). Increasing the capture angle may reduce the number of unsuccessful attempts at engaging the locking mechanism and/or reduce the time spent positioning the steerable axle prior to attempting to engage the locking mechanism. The misalignment angle may be defined as the angular difference in position between a given point on the lock member in the unlocked position and in the locked position. The capture angle may be defined as the maximum initial misalignment angle that the locking mechanism can accommodate while still engaging.

When the lock member is in the locked position the lock member and the bearing pads may be said to be aligned. The degree of misalignment between the lock member and the bearing pads may be defined as the rotation of the lock member relative to the bearing pads away from this aligned position. The landing gear may be arranged such that when the lock member is in the locked position, that is to say when the lock member and the bearing pads are aligned, the steerable axle is in the straight ahead position. The bearing pads may be associated with the axle such that pivoting of the axle results in rotation of the bearing pads and vice versa. Accordingly, aligning the lock member and the bearing pads may move the steerable axle into the straight ahead position. Thus, embodiments in accordance with the presence invention may allow the steerable axis to be moved into the straight ahead position in two stages.

Movement of the lock member from the unlocked position to the locked position may comprise a movement of the lock member relative to the bogie, for example a pivoting of the lock member about one end. In the case that the lock member is not precisely lined up with the bearing pads at the start of the locking movement, it may be necessary to move the lock member into alignment with the bearing pads such that the lock member can engage the bearing pads at the end of the locking movement. Moving the lock member and the bearing pads into alignment may comprise a rotation of the bearing pads (and the steerable axle associated therewith) relative to the lock member and/or the bogie. The alignment movement may be caused by the interaction between a guide surface and the respective bearing pad. Using the interaction between the guide surface and the respective bearing pad to bring the lock member and the bearing pads into alignment may provide a mechanically simple and reliable method of bringing the steerable axle into the straight ahead position.

The contact between the surface of a first inclined portion and the corresponding bearing pad may produce a first relative movement of the lock member and the bearing pads which reduces the misalignment angle. The contact between the surface of a second inclined portion and the corresponding bearing pad may produce a second relative movement of the lock member and the bearing pads which brings the bearing pads and the lock member into alignment.

A guide surface may guide the lock member and the bearing pads into alignment through contact between the guide surface and the bearing pads. The guide surface preferably comprises the first and second inclined portions. It will be appreciated that the profile of the guide surface may vary in dependence on the profile of the corresponding bearing pad while still providing a movement comprising two stages.

The guide surface may comprise a plurality of portions, each portion having a different profile to any adjacent portion. The profile of a portion may be defined in terms of the angle of inclination of the guide surface in that region with respect to the direction of travel of the lock member relative to the bogie when the lock member travels between an unlocked position and the locked position (referred to hereafter as the direction of the locking movement). Thus, the surface of the first and/or second inclined portion may be inclined at an angle (i.e. non-parallel and non-perpendicular) to the direction of the locking movement. It may be that contact between the surface of an inclined portion and the corresponding bearing plate produces a reactive force having a component perpendicular to the direction of the locking movement.

The first and/or second inclined portion may be inclined such that the width of the lock member increases with distance along the length of that portion. The profile of the two first inclined portions may result in a tapering of the lock member towards the front of the lock member at a first tapered region. The profile of the two second inclined portions may result in a tapering of the lock member towards the front of the lock member at a second tapered region. The first tapered region may be located forward of the second tapered region.

The profile of the first inclined portion may differ from the profile of the second inclined portion. The gradient of the first inclined portion may differ from the gradient of the second inclined portion. The gradient of an inclined portion may vary along the length of that portion. The gradient of the first inclined portion may vary in a different manner to the gradient of the second inclined portion. That is to say, the rate of change of the gradient with distance along the length of the portion may differ as between the first and second inclined portions. The gradient of the first and/or second inclined portion may be constant along the length of that portion. The gradient of the first and second inclined portions may be constant along the length of each portion, with each portion having a different gradient.

Each guide surface may include an intermediate portion located between the first inclined portion and the second inclined portion. Said intermediate portion may be orientated such that, during movement of the lock member from the unlocked position to the locked position, the intermediate portion does not cause any substantial movement to align the lock member and the bearing pads. The intermediate portions (on each guide surface) may be substantially parallel. During the locking process oscillatory forces originating at the wheels may cause the bearing pads to move relative to the lock member such that the contact between a guide surface and the respective bearing pad produces a force that acts to push the lock member out of the space between the bearing pads (hereafter referred to as an unlocking force). The magnitude of these forces may be increased when the inclination of the guide surface increases. Including the intermediate portions described above, may therefore allow a reduction in the unlocking forces generated during the locking process in comparison with prior art lock members.

The first and second inclined portions may be spaced apart by an intermediate portion. The surface of the intermediate portion may be substantially parallel to the direction of the locking movement. It will be appreciated that an intermediate portion is not necessarily parallel to the direction of motion of the lock member but may be substantially less inclined that the first and/or second inclined portion.

The lock member may include a stop on either side, the stop being arranged to abut the respective bearing pad when the lock member is in the locked position such that further movement of the lock member into the space between the bearing pads is prevented. Each stop may be in the form of a protrusion on the side of the lock member. A stop may have a front surface orientated perpendicular to the direction of motion of the lock member relative to the bogie when the lock member moves from the unlocked position to the locked position.

The lock member may be said to move in a forward direction when it moves relative to the bogie from the unlocked position to the locked position. The lock member may be said to move in a rearward direction when it moves relative to the bogie from the locked position to the unlocked position. The surface of the lock member facing in the forward direction may be referred to as the front of the lock member. The surface of the lock member facing in the rearward direction maybe referred to as the back of the lock member.

The lock member may be arranged such that the guide surface is located forward of the respective stop on the lock member. Locating the guide surface forward of the respective stop has been found to improve load distribution within the locking assembly. It may be that the stops remain outside the space between the bearing pads when the lock member is in the locked position.

It will be appreciated that the unlocked position is not a single position of the lock member relative to the bearing pads, but may be any one of a number of positions in which the axle is free to rotate depending on the angle of the steerable axle (and therefore the bearing pads) relative to the lock member and/or bogie.

The locking assembly is preferably arranged such that in the locked position the lock member engages the bearing pads to prevent any significant pivotal movement of the axle with respect to the bogie in either direction (i.e. clockwise or anticlockwise). It will be appreciated that in practice there may be some play between the bearing pads and the lock member but any such movement will be limited to such an extent that the direction of motion of the aircraft is not effected and any wheel attached to the steerable axle remains in a straight ahead position.

Each guide surface may include an intermediate portion located between the second inclined portion and the respective stop. Said intermediate portion may be orientated such that, during movement of the lock member from the unlocked position to the locked position, the intermediate portion does not cause any substantial movement to align the lock member and the bearing pads. Thus, it may be that each guide surface includes a first intermediate portion located between the first inclined portion and the second inclined portion, and a second intermediate portion located between the second inclined portion and the respective stop. The combination of one or more intermediate portions interspersed with the inclined portions along the length of the guide surface may facilitate designs of locking assembly that produce a two (or more)-stage movement to bring the lock member and bearing pads into alignment.

It will be appreciated that the guide surface may include a transition region at the start or end of an inclined portion. In a transition region the gradient of the guide surface may change rapidly over a short distance in order to reconcile the profile of a first region (for example a first inclined region) and a second region (for example an intermediate region). The length of the transition region may be very much less than the length of an inclined region and/or an intermediate region.

According to a second aspect of the invention, there is provided a lock member for use in a landing gear having a lock assembly in accordance with the first aspect. The lock assembly may comprise a guide surface on either side, each guide surface comprising a first inclined portion and a second inclined portion.

The lock member may be symmetrical about a centre line. The bearing pads may be arranged symmetrically about the lock member. In the case where the lock member is symmetrical, an inclined portion may be angled with respect to the centre line of the lock member.

The profile of the guide surfaces may be such that the width of the lock member increases with distance from the front of the lock member towards the back of the lock member. The lock member may have a first width at a first location on the guide surface. The lock member may have a second width at a second location, spaced apart from the first location in a rearward direction along the guide surface. The lock member may have a third width at a third location spaced apart from the second location a rearward direction along the guide surface. The second width may be wider than the first width. The third width may be wider than the second width. There may be a change in the rate of change of width with respect to distance in the rearward direction at a location between the first and second location and at a location between the second and third locations such that the guide surface produces a two-stage movement of the lock member and the bearing pads.

According to a third aspect of the invention, there is provided an aircraft including a landing gear in accordance with the first aspect.

According to a fourth aspect of the invention, there is provided a method of locking an aircraft landing gear using a locking assembly, the landing gear comprising a bogie and a steerable axle pivotally mounted on the bogie, wherein the locking assembly comprises a pair of spaced-apart bearing pads associated with the axle and a lock member associated with the bogie, the lock member having a guide surface on either side, the guide surface comprising a first inclined portion and a second inclined portion, the method comprising the steps of: moving the lock member from an unlocked position in which the lock member is disengaged from the bearing pads such that pivotal movement of the axle with respect to the bogie can occur, towards a locked position in which the lock member is located in the space between the bearing pads such that the lock member engages the bearing pads to prevent pivotal movement of the steerable axle with respect to the bogie, and while the lock member is moving from the unlocked position towards the locked position, bringing the lock member and the bearing pads into alignment using the guide surface. The step of bringing the lock member and the bearing pads into alignment may comprising a first stage of alignment produced by the interaction of the bearing pads and the first inclined portions, followed by a second stage of alignment produced by the interaction of the bearing pads and the second inclined portions.

It will be appreciated that the first stage of alignment reduces the misalignment angle between the lock member and the bearing pads, while the second stage of alignment finishes the alignment process by bring the lock member and the bearing pads into alignment.

It may be that the method further includes a step of steering the axle such that the degree of misalignment of the lock member and the bearing pads is less than or equal to a predetermined capture angle, before moving the lock member from the unlocked position towards the locked position. The predetermined capture angle may be less than 10 degrees, for example less than 5 degrees but greater than 1 degree.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 2:
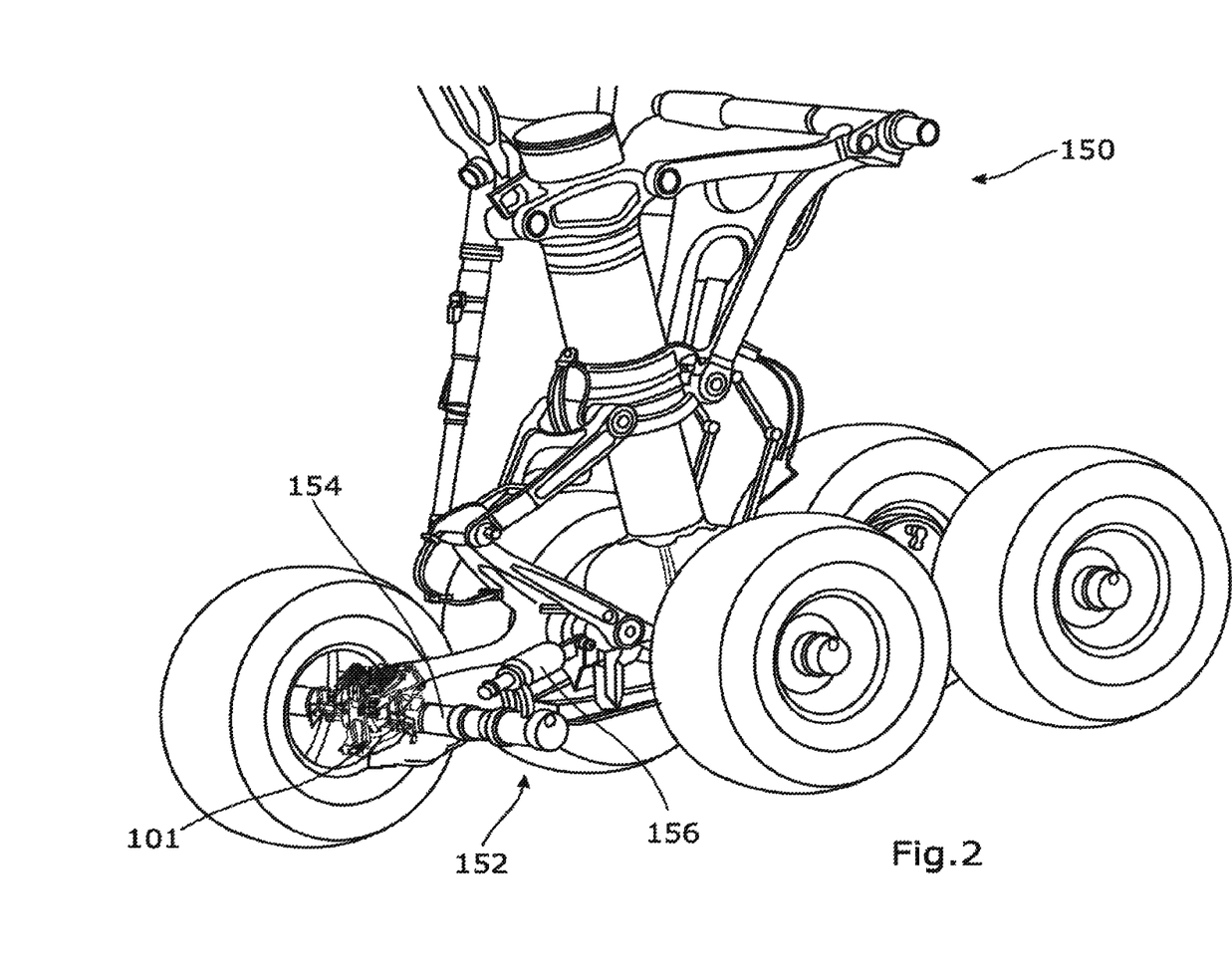
FIG. 2 shows a landing gear according to a first embodiment of the invention.

FIG. 2 shows a multi-wheel landing gear 150 having a bogie 152 with a steerable rear axle 154 and a locking mechanism 101 in accordance with an embodiment of the present invention. An actuator 156 extends between the bogie 152 and the steerable rear axle 154. In use, the actuator 156 extends and retracts to alter the orientation of the steerable axle.

Figure 3:
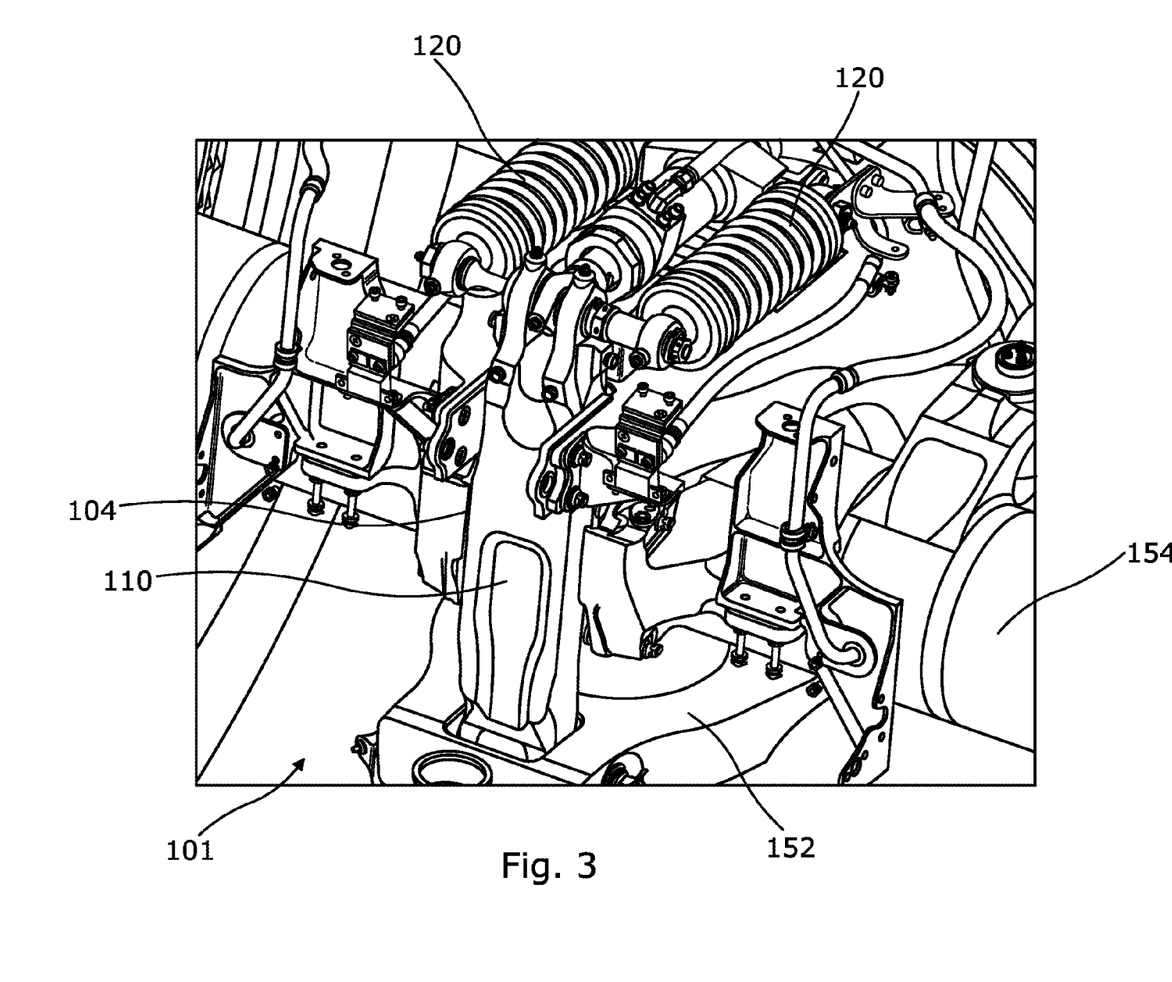
FIG. 3 shows close-up view of a portion of the locking assembly of the landing gear of the first embodiment.

FIG. 3 shows a close-up view of part of the locking mechanism 101 of the landing gear 150 of FIG. 2. The locking mechanism 101 comprises a lock member 110 pivotally connected at its lower end to the bogie 152 and pivotally connected at its upper end to a pair of springs 120. When the lock member 110 is in the locked position shown in FIG. 3, part of the lock member 110 lies within a recess 104 integrally formed with the steerable axle 154. Bearing pads 106 (not shown in FIG. 3) are located in the recess 104 and contact the portion of the lock member 110 located in the recess on either side.

In use, when pivotal movement of the steerable axle 154 is required, a locking actuator (not shown) is arranged to counteract the action of the springs 120 and to rotate the lock member 110 away from the recess 104 such that the steerable rear axle 154 can move relative to the lock member 110 and the bogie 152 on which the lock member 110 is mounted. When the axle 154 is to be locked in the straight ahead position the force exerted by the locking actuator on the lock member 110 is reversed such that the springs 120 and actuator act together to rotate the lock member 110 forwards until part of the lock member 110 is located in the recess 104 and is engaged with the bearing pads 106.

FIGS. 4(a) to 4(d) shows a series of schematic cross-sectional view of a locking mechanism 101 in accordance with the first embodiment of the invention, with the lock member 110 in (a) an unlocked position, (b) during a first alignment stage, (c) during a second alignment stage and (d) in a locked position.

Figure 4A:
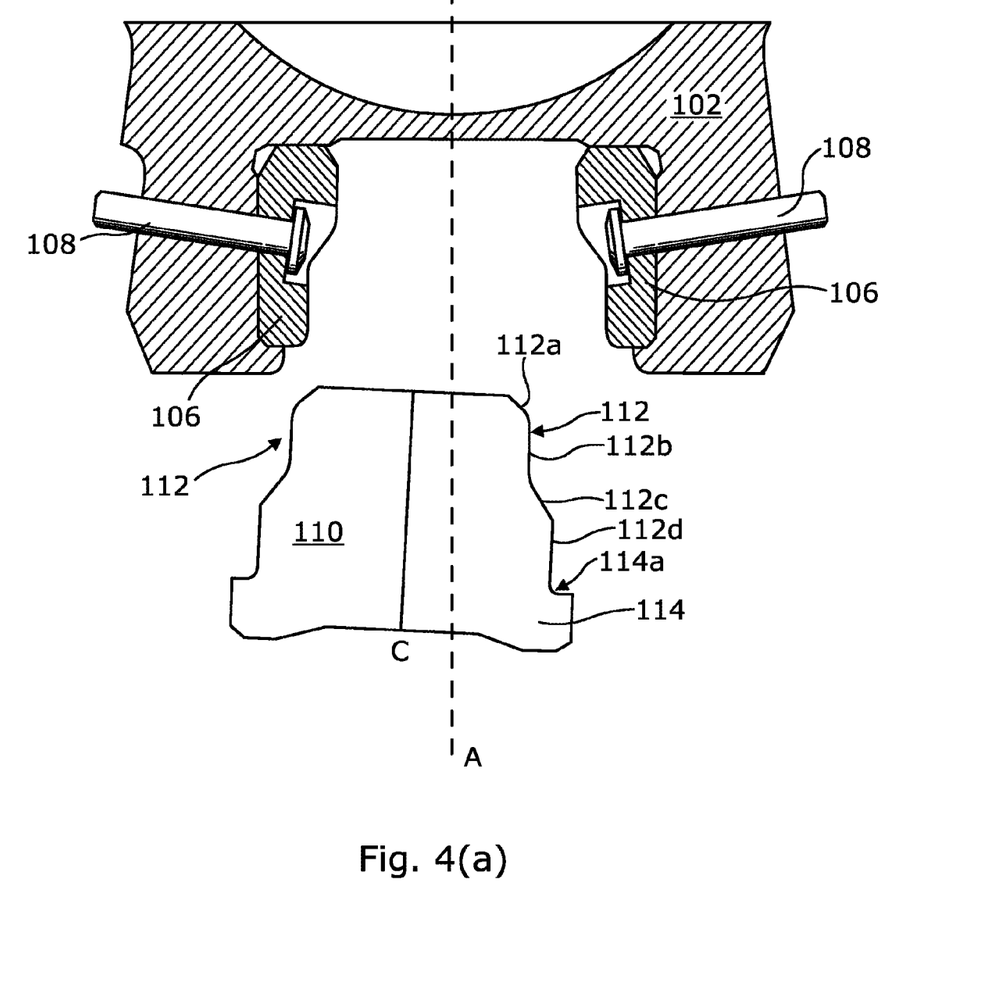
FIGS. 4(a) to (d) show a cross-sectional schematic view of a locking assembly in accordance with the first embodiment in an unlocked position, during a first alignment stage, during a second alignment stage and in the locked position respectively.

FIG. 4(a) shows the lock member 110 which is symmetrical about a centre line C. The front surface of the lock member faces towards the recess 104 which is formed in the body of the steerable axle 102 and which appears u-shaped when viewed in plan in FIG. 4(a). A guide surface 112 extends rearwards along each side of the lock member 101 from the front of the lock member 101. The profile of the guide surface is stepped, and changes with distance from the front of the lock member 101. In order from front to back along the side of the lock member 110, the guide surface 112 includes a first inclined portion 112a, inclined at an angle to the direction of travel of the lock member, a first intermediate portion 112b having a very much reduced angle of inclination in comparison to the first inclined portion 112a, a second inclined portion 112c inclined at a different angle to the first inclined portion 112a and a second intermediate portion 112d extending in a direction substantially parallel to the centre line C of the lock member 110. Thus, each guide surface 112 has a stepped profile when viewed in cross section. The gradient of each inclined portion 112a, 112c is substantially constant along the length of that portion. To the rear of each guide surface 112 the body of the lock member 110 protrudes outwards to form a stop 114 having an abutment surface 114a that extends substantially perpendicular to the direction of travel. Accordingly, when viewed in cross-section in FIG. 4(a), the front side of the lock member 110 (i.e. the end nearest to the recess 104) is narrower than the rear side of the lock member 110.

Two bearing pads 106 are located opposite each other on either side of the recess 104. The width of each bearing pad 106 increases in with distance into the recess 104. The surface of each bearing pad 106 is shaped so as to be complementary to the first intermediate portion 112b, the second inclined portion 112c and the second intermediate portion 112d. In FIG. 4(d) a dashed line A is used to denote the angle of the centre line C of the lock member 110 relative to the bearing pads 106 when the lock member 110 is in the locked position (i.e. when the lock member 110 is aligned with the bearing pads 106). In the unlocked position shown in FIG. 4(a) the centre line C is angled with respect to A.

In use, the lock member 110 moves from the unlocked position to the locked position by pivoting about its lower end. If the steerable axle is in the straight ahead position when this pivoting occurs then the pivoting movement of the lock member 110 will bring the lock member 110 into engagement with the bearing pads 106. However, if, as shown in FIG. 4(a), the lock member and bearing pads are initially misaligned such that the centreline C of the lock member 110 is offset from the axis A between the pads 106, it is necessary to ensure that the lock member 110 and bearing pads 106 become aligned during the locking process. If the lock member were to fail to engage the bearing pads 106, it may, for example, jam against the sides of the recess 104. If the locking mechanism 101 fails to engage this may delay the departure of a flight, or in some cases necessitate the flight returning to stand in order for the mechanism to be locked. When starting from a misaligned unlocked position as shown in FIG. 4(a) the lock member 110 moves forward towards the recess 104 under the action of the springs 120 until the first inclined portion 112a of the left-hand guide surface 112 is in contact with the left-hand bearing pad (as shown in FIG. 4(b)).

Figure 4B:
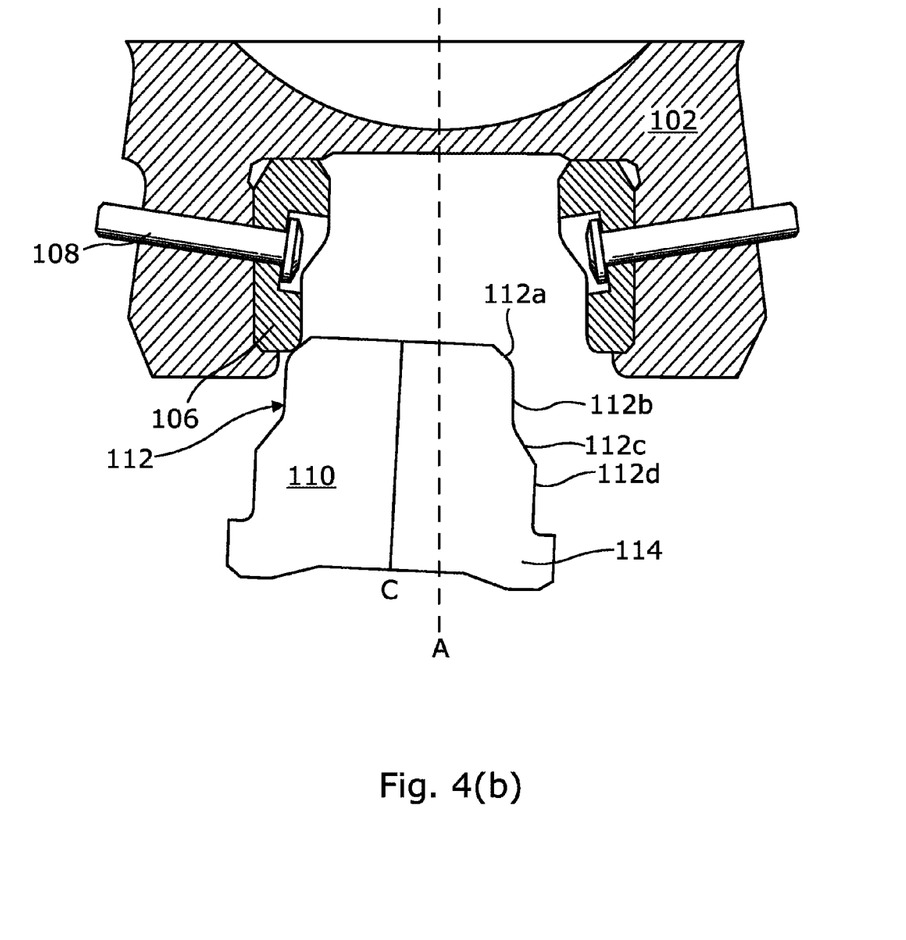

FIG. 4(b) shows the lock member 110 during a first alignment stage. A portion of the lock member 110 is located within the recess 104. The first inclined portion 112a of the left-hand side guide surface 112 is in contact with the rearmost corner of the corresponding bearing pad 106. By virtue of the relative sliding movement between the first inclined portion 112a and the pad 106 during movement of the lock member 110 towards the locked position, the lock member 110 and the pads begin to be brought into alignment (as evidenced by the angle of inclination of the line C with respect to the line A being reduced in comparison to FIG. 4(a)). As the forward movement of the lock member 110 continues the point of contact between the bearing pad 106 and the lock member 110 moves rearwards along the surface of the first inclined portion 112a of the lock member 110 until it reaches the start of the first intermediate portion 112b. The angle of inclination of the first intermediate portion 1120b is very much reduced in comparison to that of the first inclined portion 112a, and accordingly while the rearmost point of contact between the bearing pad 106 and the lock member 110 is located on the intermediate portion 112b the lock member 110 moves forward without experiencing any significant movement of the bearing pads 106 further into alignment with the lock member 110. Further forward movement of the lock member 110 results in the bearing pads 106 coming into contact with the second inclined portion 112c as shown in FIG. 4(c).

Figure 4C:
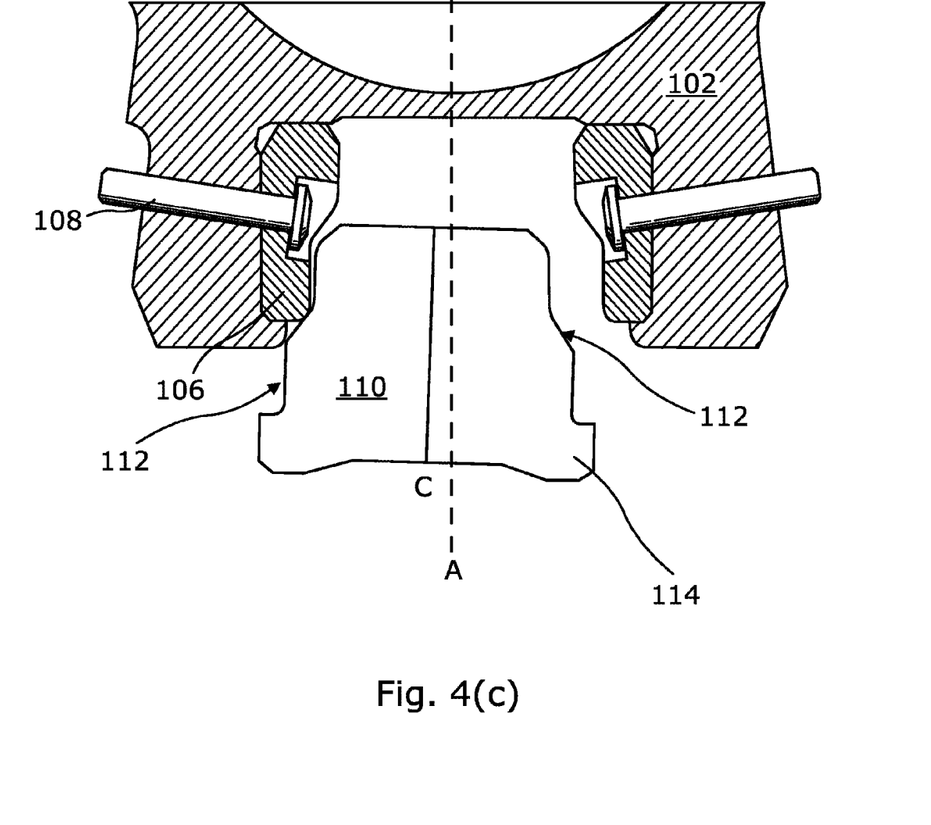
Figure 4D:
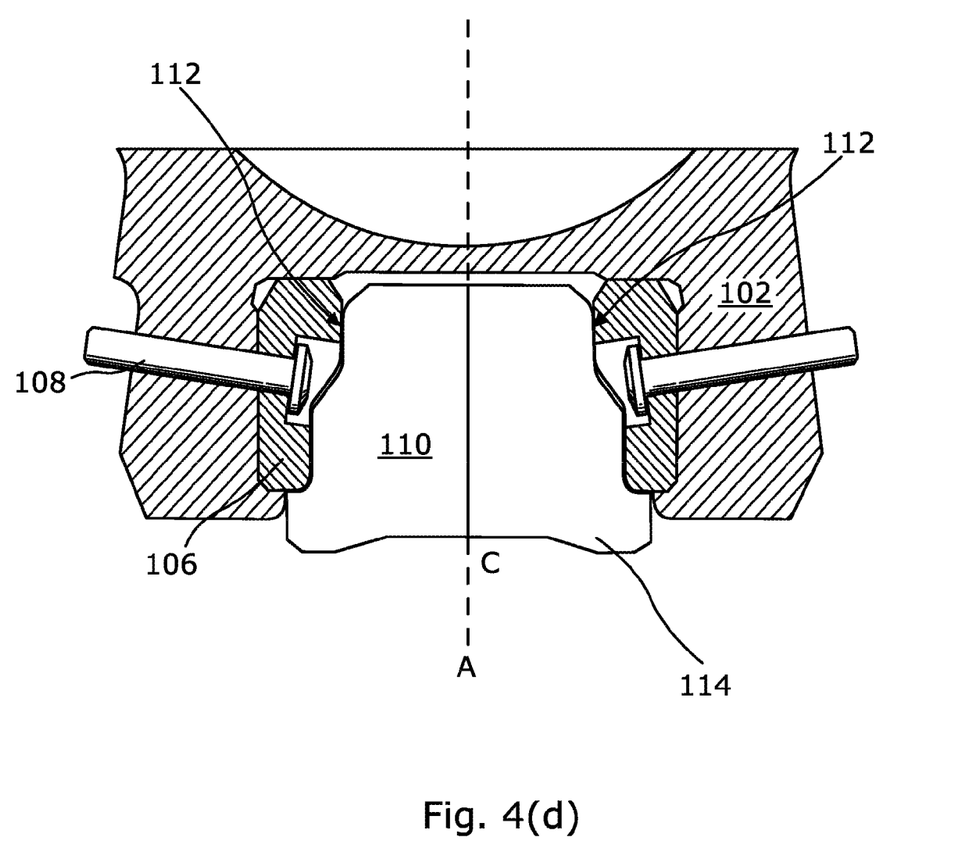
Figure 5:
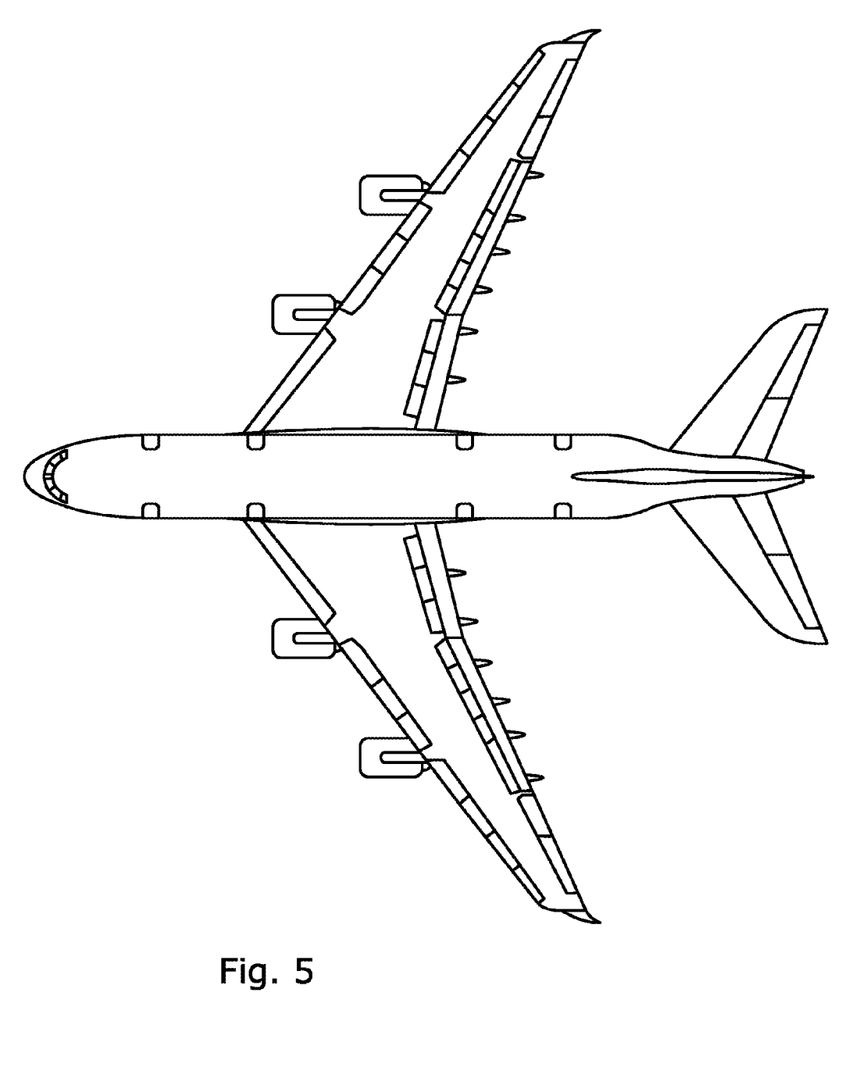
FIG. 5 shows an aircraft including a landing gear according to an embodiment of the invention.

FIG. 4(c) shows the lock member 110 during a second, subsequent, alignment stage. The lock member 110 is located further into the recess 104 than in FIG. 4(b). The second inclined portion 112c of the left-hand side guide surface 112 is in contact with the rearmost corner of the corresponding bearing pad 106. By virtue of the relative sliding movement between the second inclined portion 112c and the pad 106 during movement of the lock member 110 towards the locked position, the lock member 110 and the pads begin to be brought further into alignment (as evidenced by the angle of inclination of the line C with respect to the line A is reduced in comparison to FIG. 4(b)) in a second significant period of movement. The inclination of the first and second inclined portions 112a, 112c is such that by the end of this second stage of movement the bearing pads 106 have rotated relative to the lock member 110 until the bearing pads 10 and the lock members 110 are aligned and the steerable axle 154 is in the straight ahead position. After the second stage of alignment the lock member 110 then continues to move forward without further substantial rotation of the bearing pads 106 relative to the lock member 110 as the second intermediate surface 112d is substantially parallel to the direction of travel. This forward motion continues until the upper surface 114a of the stop 114 contacts the bearing pad 106 on either side of the lock member 110. The lock member 110 is then engaged with the bearing pads 106 as shown in FIG. 4(d).

FIG. 4(d) shows the lock member 110 in the locked position. On both sides of the lock member 110 the first intermediate portion 112b, second inclined portion 112c and second intermediate portion 112d of the guide surface 112 are in contact with the corresponding bearing pad 106. The upper surface 114a of each stop 114 is in contact with the rear surface of the corresponding bearing pad 106. The line C is aligned with the line A.

The landing gear 150 and lock member 101 are arranged such that when the lock member is in the locked position as shown in FIG. 4(d) the steerable axle is in the straight ahead position. Accordingly, the two-stage movement that brings the lock member and the bearing pads into alignment also brings the steerable axle into the straight ahead position.

Locking mechanisms in accordance with the present embodiment may be advantageous as the profile of the guide surfaces of the lock member results in the bearing pads and lock member being guided into alignment in two stages, thereby reducing the risk of the lock member failing to engage. The two-stage profile of the lock member may also allow locking mechanisms in accordance with the present embodiment to cope with a greater degree of misalignment between the bearing pads and the lock member, at the start of the movement between the unlocked position and the locked position than prior art mechanisms (i.e. embodiments of the invention have a relatively large 'capture angle'). This may reduce the probability of the locking mechanism failing to successfully engage and/or reduce the need to so closely align the lock member before beginning the locking process. Locking mechanisms in accordance with the present embodiment may also be advantageous because the profile of the intermediate portions may result in relatively low unlocking forces (see above) being generated, thereby further reducing the probability of the locking mechanism failing to successfully engage.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Each inclined portion of the embodiment described above has a gradient that is constant along the length of the portion. It will be appreciated that the gradient of an inclined portion may vary along its length. It will also be appreciated that the geometry of the bearing pads and the consequently the profile of the inclined sections may vary while still producing a two-stage movement. It will be appreciated that the alignment movement may comprise more than two stages. It will be appreciated that the guide surfaces may include further inclined portions arranged to produce a movement including further stages.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear comprising a bogie, a steerable axle pivotally mounted on the bogie, and a locking assembly,
   the locking assembly comprising a pair of spaced-apart stationary bearing pads associated with the axle and a lock member associated with the bogie, the lock member being moveable between a locked position in which the member is located in the space between the bearing pads such that the lock member engages the bearing pads to prevent pivotal movement of the steerable axle with respect to the bogie, and an unlocked position in which the lock member is disengaged from the bearing pads such that pivotal movement of the axle with respect to the bogie can occur, wherein the bearing pads remain stationary between the locked and unlocked positions,
   wherein the lock member has a guide surface on either side for guiding the lock member and the bearing pads into alignment during movement of the lock member from the unlocked position to the locked position, and
   wherein the guide surface comprises a first inclined portion for moving the lock member towards alignment with the bearing pads in a first stage, and a second inclined portion, spaced apart from the first portion, for moving the lock member into alignment with the bearing pads in a second stage, such that the lock member and bearing pads are aligned in a movement comprising two stages.

2. An aircraft landing gear according to claim 1, wherein the profile of the first inclined portion differs from the profile of the second inclined portion.

3. An aircraft landing gear according to claim 2, wherein the gradient of the first inclined portion differs from the gradient of the second inclined portion.

4. An aircraft landing gear according to claim 1, wherein the angle of inclination of the first and/or second portion is constant along the length of that portion.

5. An aircraft landing gear according to claim 1, wherein each guide surface includes an intermediate portion located between the first inclined portion and the second inclined portion and said intermediate portion is orientated such that, during movement of the lock member from the unlocked position to the locked position, the intermediate portion does not cause any substantial movement to align the lock member and the bearing pads.

6. An aircraft landing gear according to claim 1, wherein the lock member includes a stop on either side, the stop being arranged to abut the respective bearing pad when the lock member is in the locked position such that further movement of the lock member into the space between the bearing pads is prevented.

7. An aircraft landing gear according to claim 6, wherein the lock member is arranged such that the guide surface is located forward of the respective stop on the lock member.

8. An aircraft landing gear according to claim 7, wherein the stops remain outside the space between the bearing pads when the lock member is in the locked position.

9. An aircraft landing gear according to claim 6, wherein each guide surface includes an intermediate portion located between the second inclined portion and respective stop, and said intermediate portion is orientated such that, during movement of the lock member from the unlocked position to the locked position, the intermediate portion does not cause any substantial movement to align the lock member and the bearing pads.

10. A lock member for using in the aircraft landing gear having the lock assembly of claim 1, the lock member having a guide surface on either side, each guide surface comprising a first inclined portion and a second inclined portion, spaced apart from the first portion.

11. An aircraft including a landing gear in accordance with claim 1.

12. A method of locking an aircraft landing gear using a locking assembly, the landing gear comprising a bogie and a steerable axle pivotally mounted on the bogie, wherein the locking assembly comprises a pair of spaced-apart stationary bearing pads associated with the axle and a lock member associated with the bogie, the lock member having a guide surface on either side, the guide surface comprising a first inclined portion and a second inclined portion, the method comprising the steps of:

moving the lock member from an unlocked position in which the lock member is disengaged from the bearing pads such that pivotal movement of the axle with respect to the bogie can occur, towards a locked position in which the lock member is located in the space between the bearing pads such that the lock member engages the bearing pads to prevent pivotal movement of the steerable axle with respect to the bogie, wherein the bearing pads remain stationary between the locked and unlocked positions, and while the lock member is moving from the unlocked position towards the locked position, bringing the lock member and the bearing pads into alignment using the guide surface, the step of bringing the lock member and the bearing pads into alignment comprising a first stage of alignment produced by the interaction of the bearing pads and the first inclined portions, followed by a second stage of alignment produced by the interaction of the bearing pads and the second inclined portions.

13. A method according to claim 12, wherein the method further includes a step of steering the axle such that the degree of misalignment of the lock member and the bearing pads is less than or equal to a predetermined capture angle, before moving the lock member from the unlocked position towards the locked position.

* * * * *